(12) United States Patent
Hiramatsu et al.

(10) Patent No.: US 8,400,316 B2
(45) Date of Patent: Mar. 19, 2013

(54) ELECTRONIC THERMOMETER

(75) Inventors: Hiroshi Hiramatsu, Kyoto (JP); Yoshihide Onishi, Dalian (CN); Masaki Tomioka, Kyoto (JP); Atsuko Fukui, Ashiya (JP); Daisuke Ishihara, Amagasaki (JP); Katsuyoshi Morita, Nagaokakyo (JP)

(73) Assignee: Omron Healthcare Co., Ltd., Kyoto (JP)

( * ) Notice: Subject to any disclaimer, the term of this patent is extended or adjusted under 35 U.S.C. 154(b) by 228 days.

(21) Appl. No.: 12/867,410

(22) PCT Filed: Feb. 17, 2009

(86) PCT No.: PCT/JP2009/052703
§ 371 (c)(1),
(2), (4) Date: Aug. 12, 2010

(87) PCT Pub. No.: WO2009/104604
PCT Pub. Date: Aug. 27, 2009

(65) Prior Publication Data
US 2010/0315258 A1    Dec. 16, 2010

(30) Foreign Application Priority Data
Feb. 22, 2008  (JP) ................................ 2008-041616

(51) Int. Cl.
*G08B 17/00* (2006.01)
(52) U.S. Cl. .................. 340/584; 340/539.12; 340/586; 374/100; 374/163; 600/549
(58) Field of Classification Search ............. 340/539.12, 340/584; 600/300, 549; 374/163, 100
See application file for complete search history.

(56) References Cited

U.S. PATENT DOCUMENTS

| | | | | |
|---|---|---|---|---|
| 5,732,711 | A | * | 3/1998 | Fitzpatrick et al. ........... 600/549 |
| 6,090,050 | A | | 7/2000 | Constantinides |
| 6,646,567 | B1 | | 11/2003 | Olivas |
| 7,275,866 | B2 | * | 10/2007 | Tseng .......................... 374/163 |
| RE40,470 | E | * | 8/2008 | Fitzpatrick et al. ........... 600/549 |

(Continued)

FOREIGN PATENT DOCUMENTS

| JP | A-52-104176 | 9/1977 |
|---|---|---|
| JP | A-57-163833 | 10/1982 |

(Continued)

OTHER PUBLICATIONS

Russian Office Action issued in Russian Patent Application No. 2010138893 dated Sep. 23, 2011 (with translation).

(Continued)

*Primary Examiner* — Daniel Wu
*Assistant Examiner* — Son M Tang
(74) *Attorney, Agent, or Firm* — Oliff & Berridge, PLC

(57) ABSTRACT

An electronic thermometer has a probe having a temperature measuring unit at its end, a temperature sensor arranged in the temperature measuring unit of the probe, a contact sensor arranged in a position shifter from the temperature measuring unit of the probe toward a thermometer body, a determining unit for determining whether a state of contact between the temperature measuring unit and a measurement target portion of a user is good or not, based on outputs of both the temperature sensor and the contact sensor, and a notifying unit for providing a notification according to a result of the determination by the determining unit.

11 Claims, 19 Drawing Sheets

U.S. PATENT DOCUMENTS

| | | | |
|---|---|---|---|
| 7,410,291 B2 * | 8/2008 | Koch | 374/163 |
| 7,938,783 B2 * | 5/2011 | Fraden | 600/549 |
| 2010/0328090 A1 * | 12/2010 | Hiramatsu et al. | 340/687 |

FOREIGN PATENT DOCUMENTS

| | | |
|---|---|---|
| JP | A-61-500038 | 1/1986 |
| JP | U-4-138249 | 12/1992 |
| JP | Y2-7-50683 | 11/1995 |
| JP | B2-3072836 | 8/2000 |
| JP | A-2002-520109 | 7/2002 |
| JP | A-2004-264297 | 9/2004 |
| WO | WO 84/03378 A1 | 8/1984 |

OTHER PUBLICATIONS

International Search Report in International Application No. PCT/JP2009/052703, dated May 26, 2009.

* cited by examiner

FIG.4
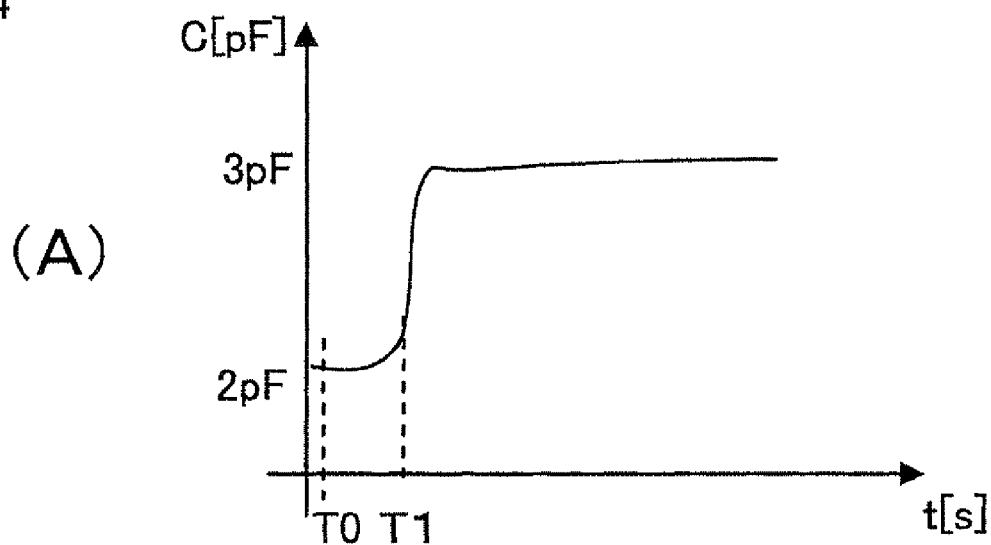
(A)
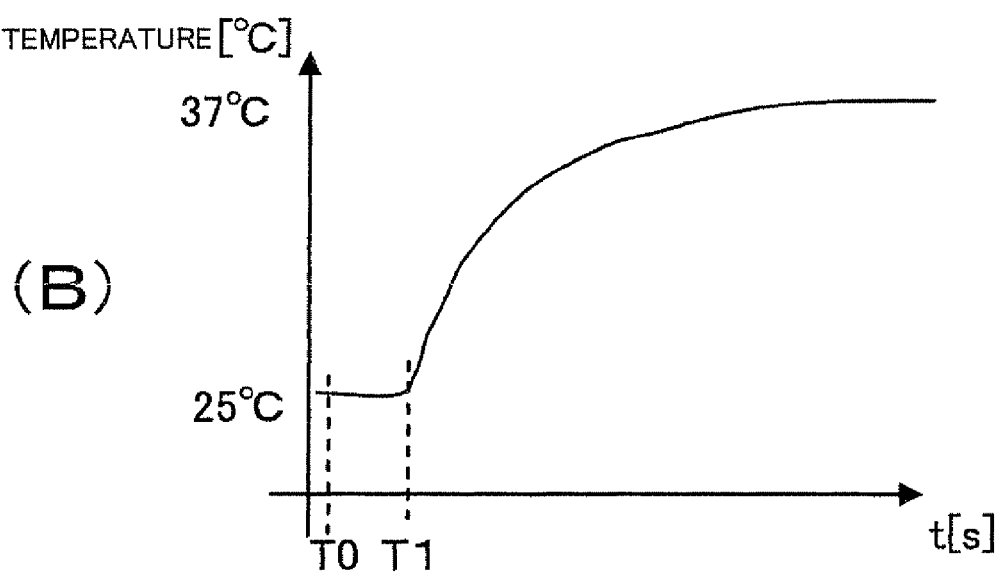
(B)

FIG.6
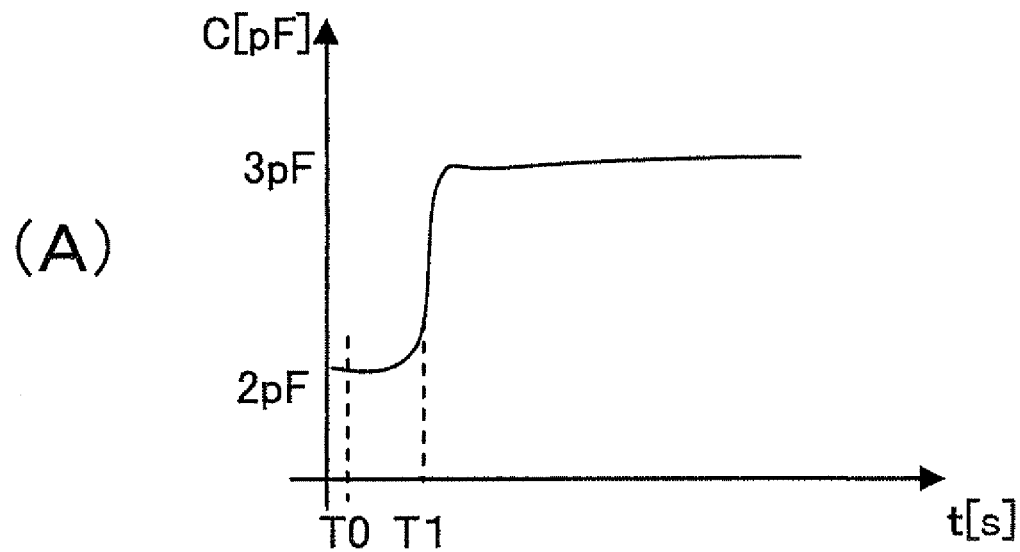
(A)
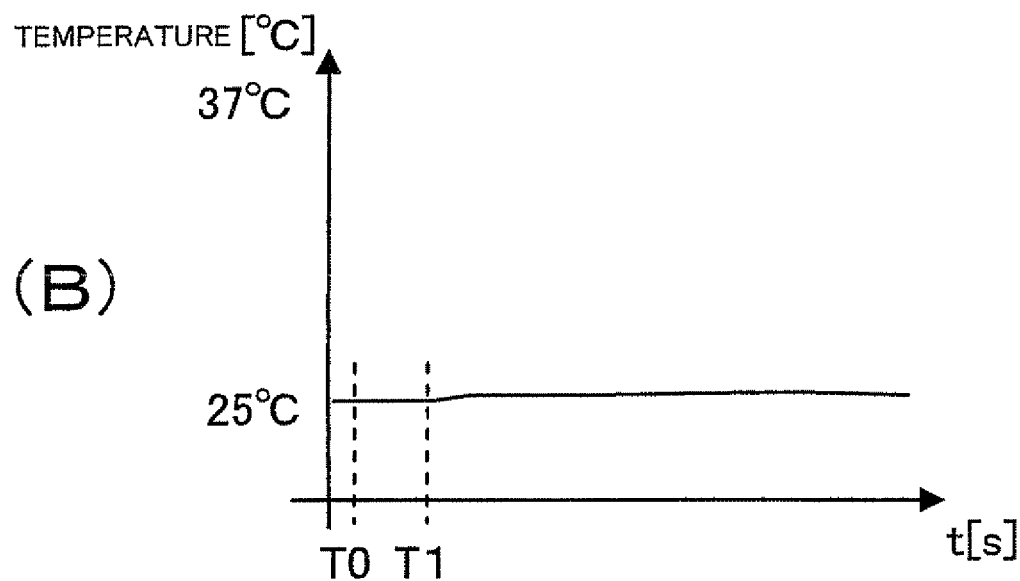
(B)

FIG.8
(A)
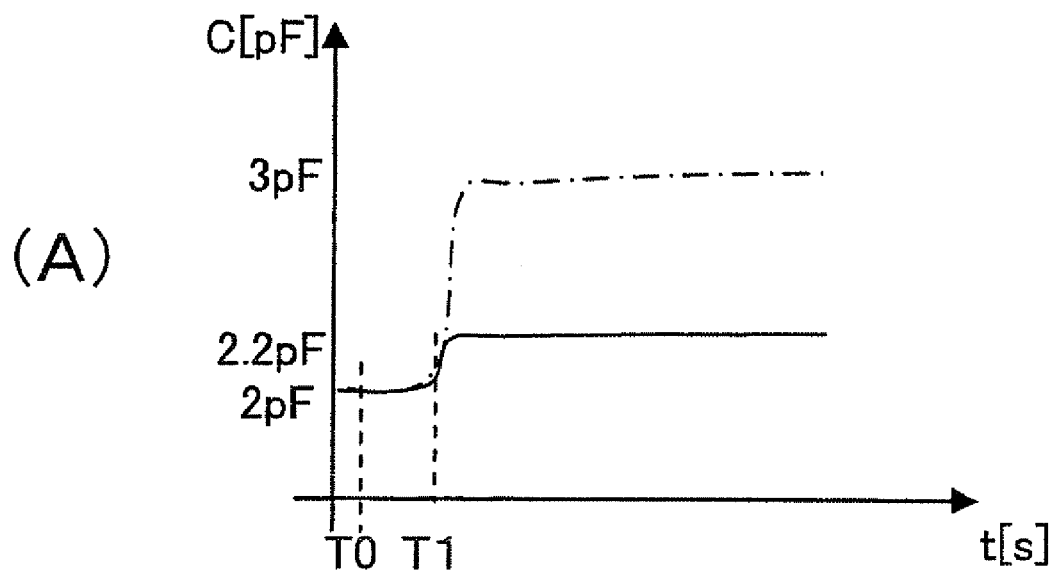
(B)
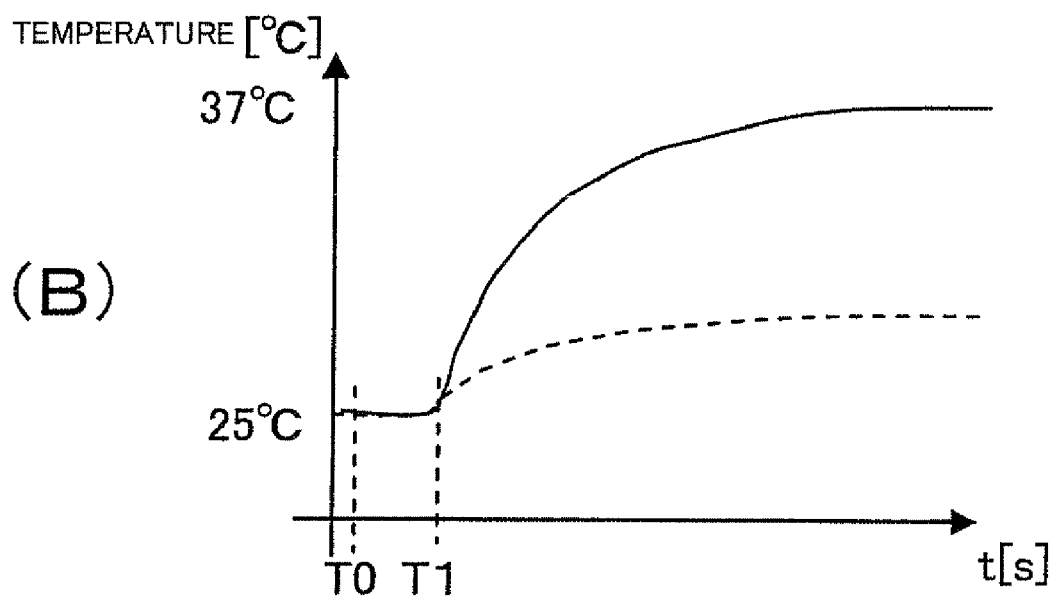

ELECTRONIC THERMOMETER

TECHNICAL FIELD

The present invention relates to an electronic thermometer.

BACKGROUND ART

There has been known an electronic thermometer of a type in which a probe is kept in an underarm or a hypoglottis for measuring a temperature (i.e., body temperature). For accurately measuring or predicting the temperature (i.e., body temperature), it is necessary in this type of thermometer to keep firmly a temperature measuring unit at the end of the probe in contact with a measurement target portion such as a central portion of a concavity of an underarm or a base end of a lower side of a tongue.

For example, a patent document 1 has disclosed an electronic thermometer that senses a contact state of a probe, using a switch, contact resistance, humidity, pressure (contact point), temperature comparison, change in temperature or the like. A patent document 2 has disclosed an electronic thermometer that has a pair of contact points at a surface of a thermometer body, and issues an alarm when there is no continuity between the contacts.

However, conventional sensing may cause a sensing error when an object other than a human body or an object such as a hand or a finger comes into contact with the probe. Also, even when the probe is kept in the underarm or hypoglottis, the temperature measuring unit at the end of the probe may shift from the measurement target portion or may not be firmly in contact with it, a position or direction of the probe or a closing state of the underarm is not correct. In the prior art, it is difficult to sense such a contact failure, resulting in a problem that the accuracy (prediction accuracy) of the body temperature measurement lowers or an error occurs.

Patent Document 1: Japanese Patent National Publication No. 61-500038
Patent Document 2: Japanese Utility Model Laying-Open No. 4-138249

DISCLOSURE OF THE INVENTION

Problems to be Solved by the Invention

The invention has been made for overcoming the above conventional problems, and an object of the invention is to provide an electronic thermometer that can accurately sense a state of contact between a temperature measuring unit and a measurement target portion.

Means for Solving the Problems

For achieving the above object, an electronic thermometer according to the invention includes a probe having a temperature measuring unit at its end; a first sensor arranged in the temperature measuring unit of the probe; a second sensor arranged in a position shifted from the temperature measuring unit of the probe toward a thermometer body; a determining unit for determining whether a state of contact between the temperature measuring unit and a measurement target portion of a user is good or not, based on both outputs of the first and second sensors; and a notifying unit for performing notification according to a result of determination of the determining unit.

By referring to both the outputs of the first and second sensors, it is possible to evaluate the states of at least two portions, i.e., the measurement target portion at the end of the probe and a portion at the position between the measurement target portion and the body. Therefore, it is possible to determine whether the contact state between the temperature measuring unit and the measurement target portion is good or not, with higher accuracy than a prior art.

Preferably, the first sensor is a sensor for measuring a temperature, and the second sensor is a sensor for sensing a contact of a human body with the probe.

Combination of the two kinds of sensors for sensing different targets, respectively, can reduce erroneous sensing. Further, the temperature is monitored in a portion to be placed on the measurement target portion (i.e., the hottest portion), and the contact sensing is performed in the portion to be placed on the portion (for holding the probe) closer to the probe body than the measurement target portion. This arrangement of the sensors can cause a large difference in output between the good contact state and the bad contact state, and therefore can improve the determination accuracy.

Preferably, the first sensor serves also as a sensor for measuring a body temperature of the user.

Since the sensor for measuring the body temperature is also used as the sensor for sensing the contact state, it is possible to offer an advantage that the number of parts, the sizes of the end of the probe and the cost can be reduced, as compared with the case where these sensors are independent of each other.

The notifying unit may be configured to notify that the contact state is bad. This can urge the user to correct the insertion state of the probe.

The notifying unit may be configured to notify that the contact state is good. Further, the notifying unit is preferably configured to notify that the contact state is good, during measurement of the body temperature.

The measurement of the body temperature requires several tens of seconds or several minutes, during which the user must keep the same posture. If the thermometer provides no notification, the user may have a fear that the body temperature measuring processing is not continuing, or the user may move the thermometer or remove it from the measurement target portion for confirming the operation of the thermometer. In view of this, the user is notified of the good contact state so that the user can recognize that the measuring processing is correctly continuing. Thereby, the above problem can be overcome.

Preferably, when the contact state is bad, the determining unit determines a level of a failure in the contact state based on the outputs of the first and second sensors, and the notifying unit performs the notification according to the level of the failure.

When the failure level can be determined, the user can determine that the contact state can be improved by slightly moving the probe, or can be improved quickly by removing the probe from the measurement target portion and reinserting it, rather than the above slight movement. This can improve the usability of the electronic thermometer.

Preferably, when the contact state is bad, the determining unit estimates a cause of a failure in the contact state based on the outputs of the first and second sensors, and the notifying unit performs the notification according to the cause of the failure. In this case, it is further preferable that the notifying unit provides guidance on solution about the cause of the failure.

By understanding the cause of the failure and the solution, the user can easily understand specific manners for improving the contact state. This improves the usability of the electronic thermometer, and can show the user the correct manner of measurement.

Effects of the Invention

As described above, the invention can provide the electronic thermometer that can accurately sense a state of contact between the temperature measuring unit and the measurement target portion.

BRIEF DESCRIPTION OF THE DRAWINGS

FIGS. 4A and 4B show an example of a sensor output waveform in the example of the correct measurement.
FIGS. 6A and 6B show an example of a sensor output waveform in the measurement example of FIG. 5.
FIGS. 8A and 8B show an example of the sensor output waveform in the measurement example of FIG. 7.

BEST MODES FOR CARRYING OUT THE INVENTION

Figure 1:
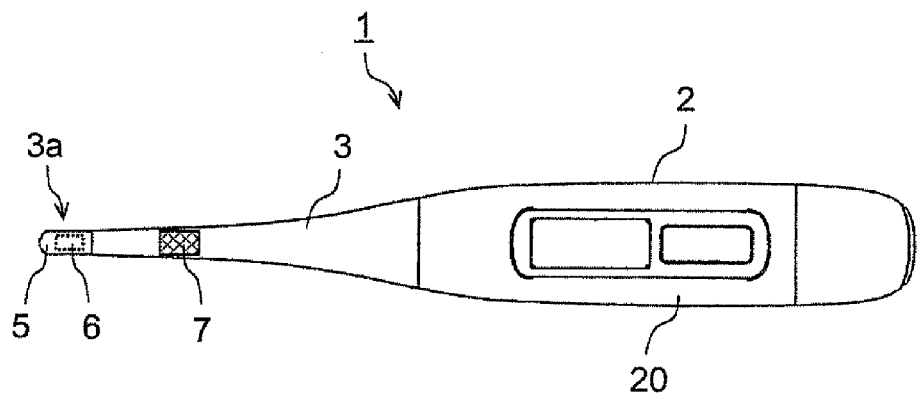
FIG. 1 shows an outer appearance of an electronic thermometer.

Referring to the drawings, best modes for carrying out the invention will be described below, by way of example, based on embodiments. However, sizes, materials, forms, relative positions and others of components described in the embodiments are not intended to restrict the scope of the invention, unless otherwise specified.
<Basic Structure of an Electronic Thermometer>
Referring first to FIG. 1, description will now be given on a basic structure of an electronic thermometer according to an embodiment of the invention. FIG. 1 schematically shows a whole structure of the electronic thermometer according to the embodiment of the invention.

As shown in FIG. 1, an electronic thermometer 1 includes a thermometer body 2 having a display, a switch and the like, and also includes a probe 3 to be held, e.g., in an underarm or a hypoglottis. Thermometer body 2 is formed of a housing 20 that is made of an ABS resin or the like and is provided with a display window, a switch and the like, as well as internal parts such as a circuit board, a power supply, a display panel, e.g., of an LCD and a buzzer arranged in housing 20. Probe 3 is a hollow rod-like member that extends lengthwise from an end, in the longitudinal direction, of thermometer body 2 having substantially a rectangular parallelepiped form, and has a tapered form converging toward a end on which a temperature measuring unit 3a is arranged. Probe 3 is made of elastomer or resin.

The structure described above is merely an example, and the invention is not restricted to it. For example, a structure having a probe integral with a housing of a thermometer body may be employed.

Temperature measuring unit 3a at the end of probe 3 is formed of a cap 5 maid of stainless steel (SUS) or the like as well as a temperature sensor (first sensor) 6 such as a thermistor that is embedded in cap 5 and is fixed thereto by an adhesive. Temperature sensor 6 is electrically connected to a CR oscillation circuit among internal parts. Temperature sensor 6 changes its resistance value according to heat transmitted from an outer surface of temperature measuring unit 3a (cap 5). Temperature measurement is performed by providing this change in resistance value to the CR oscillation circuit.

Probe 3 has a contact sensor (second sensor) 7 in a position slightly shifted from temperature measuring unit 3a toward thermometer body 2. Contact sensor 7 is employed for sensing a contact of a human body with probe 3. The temperature measuring (i.e., body temperature measuring) is performed in such a state that probe 3 is held in the underarm or the hypoglottis, and temperature measuring unit 3a (temperature sensor 6) is fixedly held in a measurement target portion (a center of a concave portion of the underarm or a base end of an underside of the tongue) where the temperature is highest. Therefore, contact sensor 7 is arranged in such a position that contact sensor 7 is sufficiently in contact with the underarm or the tongue when temperature sensor 6 is correctly attached to the measurement target portion.

Contact sensor 7 may be any type of sensor such as an electrostatic capacity sensor, pressure sensor, photoelectric sensor, temperature sensor or a switch sensor. This embodiment employs, by way of example, an electrostatic capacity sensor sensing a change in capacity due to a contact with a human body. Contact sensor 7 is electrically connected to the CR oscillation circuit among the internal parts.

Figure 2:
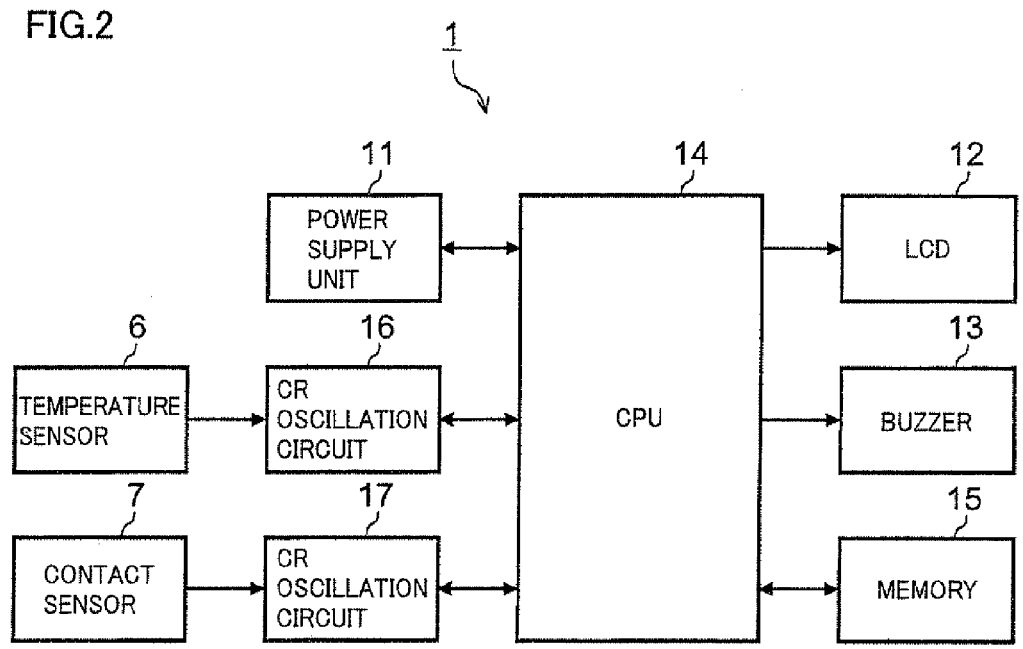
FIG. 2 is a block diagram of the electronic thermometer.

<Electrical Structure of the Electronic Thermometer>
FIG. 2 is a block diagram of the electronic thermometer. As shown in FIG. 2, electronic thermometer 1 primarily includes temperature sensor (first sensor) 6, contact sensor (second sensor) 7, a power supply unit 11, an LCD 12, a buzzer 13, a CPU (Central Processing Unit) 14, a memory 15 and CR oscillation circuits 16 and 17.

Power supply unit 11 has a power supply such as a battery and supplies an electric power to CPU 14. LCD 12 serves as a display unit and displays a result of measurement and the like under the control of CPU 14. Buzzer 13 issues an alarm under the control of CPU 14. CPU 14 is connected to memory 15 formed of a storage device such as an ROM or an RAM.

CR oscillation circuit 16 provides a signal of an oscillation frequency according to a resistance value of temperature sensor 6. CPU 14 counts this frequency signal to calculate the temperature. CR oscillation circuit 17 provides a signal of an oscillation frequency according to the electrostatic capacity of contact sensor 7. CPU 14 also counts this frequency signal to calculate the value of the electrostatic capacity.

<Sensing of the Contact State>

As described above, temperature measuring unit 3a at the end of the probe must be firmly and fixedly in contact with the predetermined measurement target portion such as the underarm or the hypoglottis for accurately measuring the body temperature. Particularly, in the prediction type of thermometer, the state of contact between the temperature measuring unit and the measurement target portion significantly affects the prediction accuracy so that it is very important to keep the good contact state. Therefore, it is preferable to check the contact state of the temperature measuring unit before the start of the temperature measuring and during the temperature measuring, to notify the user of the result of such checking and to control the operation of the thermometer when necessary.

Accordingly, in electronic thermometer 1 according to the embodiment, CPU 14 determines whether the contact state between temperature measuring unit 3a and the Measurement target portion is good or not, based on outputs (information about the temperature and the electrostatic capacity) of both temperature sensor 6 and contact sensor 7. According to the result of the determination, LCD 12 and/or buzzer 13 provides the notification. Thus, in electronic thermometer 1 according to the embodiment, CPU 14 corresponds to the determining unit in the invention, and LCD 12 and buzzer 13 correspond to the notifying unit in the invention.

The purpose of combining the outputs of temperature sensor 6 and contact sensor 7 is to reduce the sensing error and improve the sensing accuracy. Specific examples will be described below.

Figure 3:
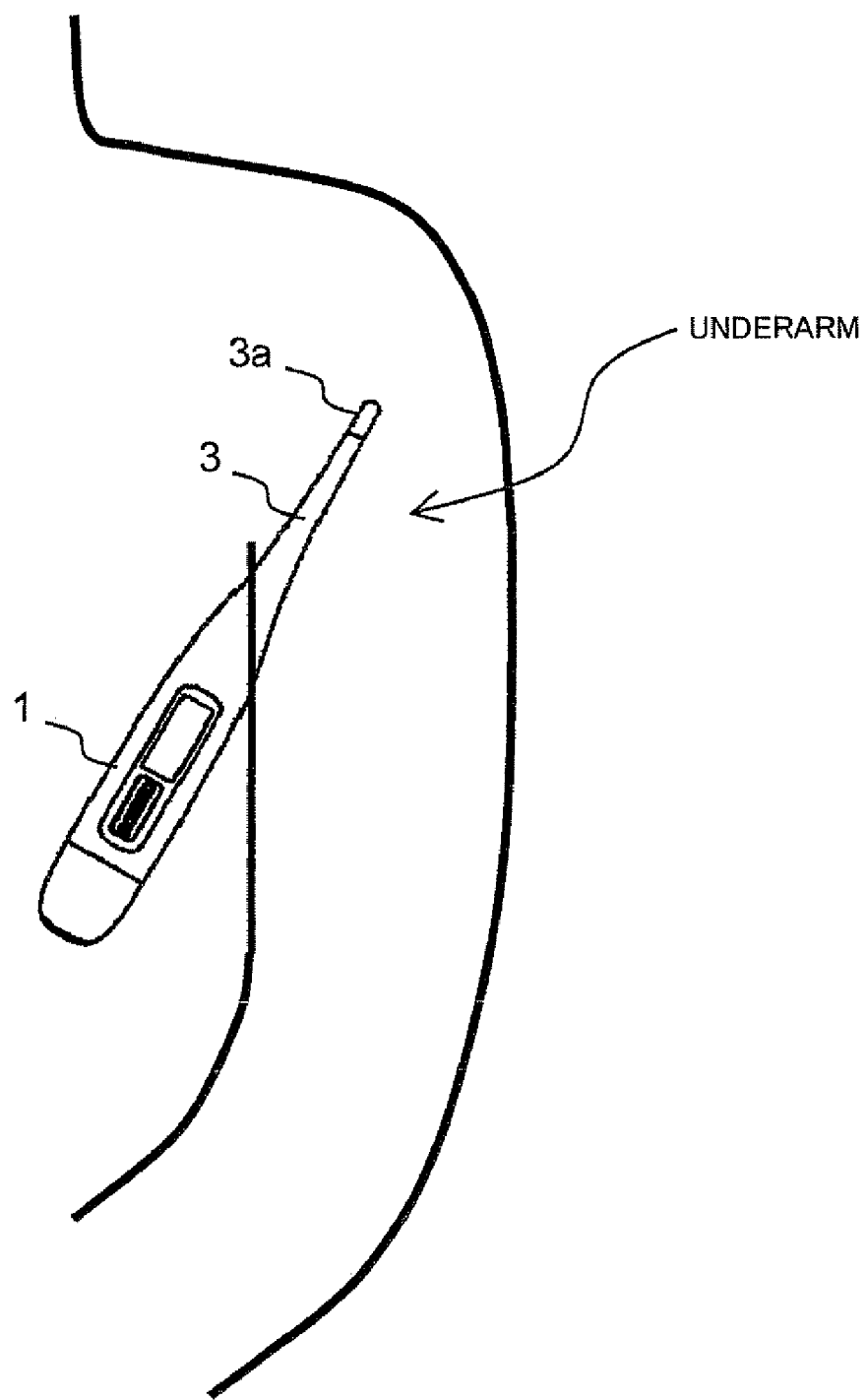
FIG. 3 shows an example of correct measurement.

FIG. 3 shows an example of the correct measurement. In the state shown in FIG. 3, probe 3 is firmly held in the underarm, and temperature measuring unit 3a at the end of the probe is correctly in contact with the measurement target portion (concavity) of the underarm. FIGS. 4A and 4B show an example of a sensor output waveform in an example of correct measurement. FIG. 4A shows an output of contact sensor 7, and has the abscissa and the ordinate giving the time and the electrostatic capacity, respectively. FIG. 4B shows an output of temperature sensor 6, and has the abscissa and the ordinate giving the time and the temperature. In an initial state (t=T0) immediately after the power-on, the electrostatic capacity is about 2 pF, and the temperature is equal to an atmospheric temperature of about 25° C. When probe 3 is held in the underarm (t=T1), the electrostatic capacity increases to about 3 pF, and the temperature starts rising. A temperature rising rate is initially large, and will become smaller as the temperature becomes closer to the body temperature.

Figure 5:
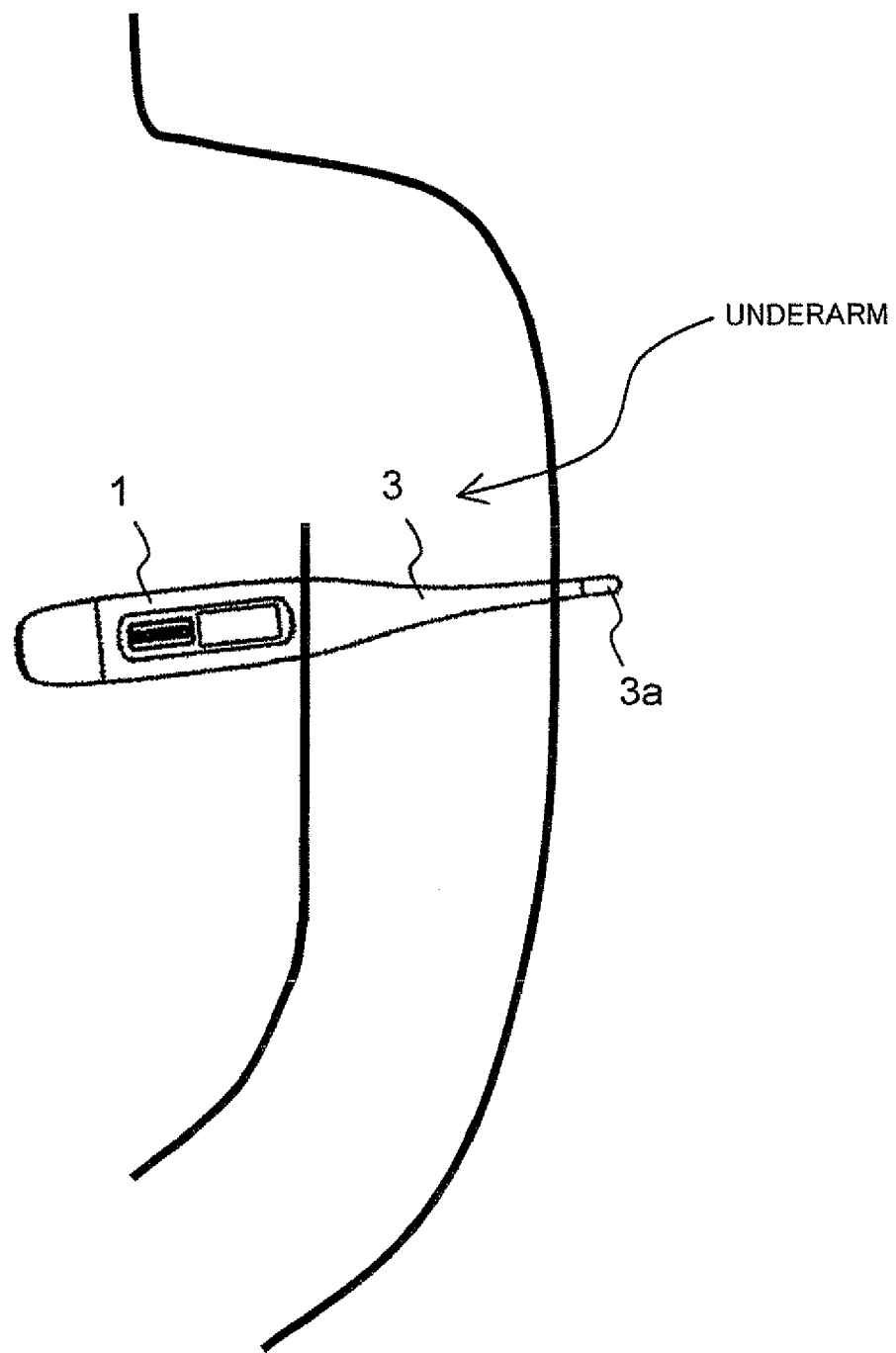
FIG. 5 shows an example 1 of bad measurement.

FIG. 5 shows an example 1 of bad measurement. In the example of FIG. 5, the thermometer is inserted excessively deeply so that temperature measuring unit 3a at the end of the probe protrudes from the underarm. FIGS. 6A and 6B show an example of the sensor output waveform in the measurement example of FIG. 5. Since temperature measuring unit 3a is not correctly in contact with the measurement target portion, a change hardly occurs in the output of the temperature sensor. However, a portion including contact sensor 7 is held in the underarm so that the change in electrostatic capacity exhibits substantially the same behavior as that in the example of the correct measurement (see FIG. 4B). Accordingly, it can be understood that the contact failure in FIG. 5 cannot be sensed when only the output of contact sensor 7 is monitored. When the user holds probe 3 with the hand or fingers, the change in electrostatic capacity shown in FIG. 6A can be monitored, and therefore the sensing error may occur.

Figure 7:
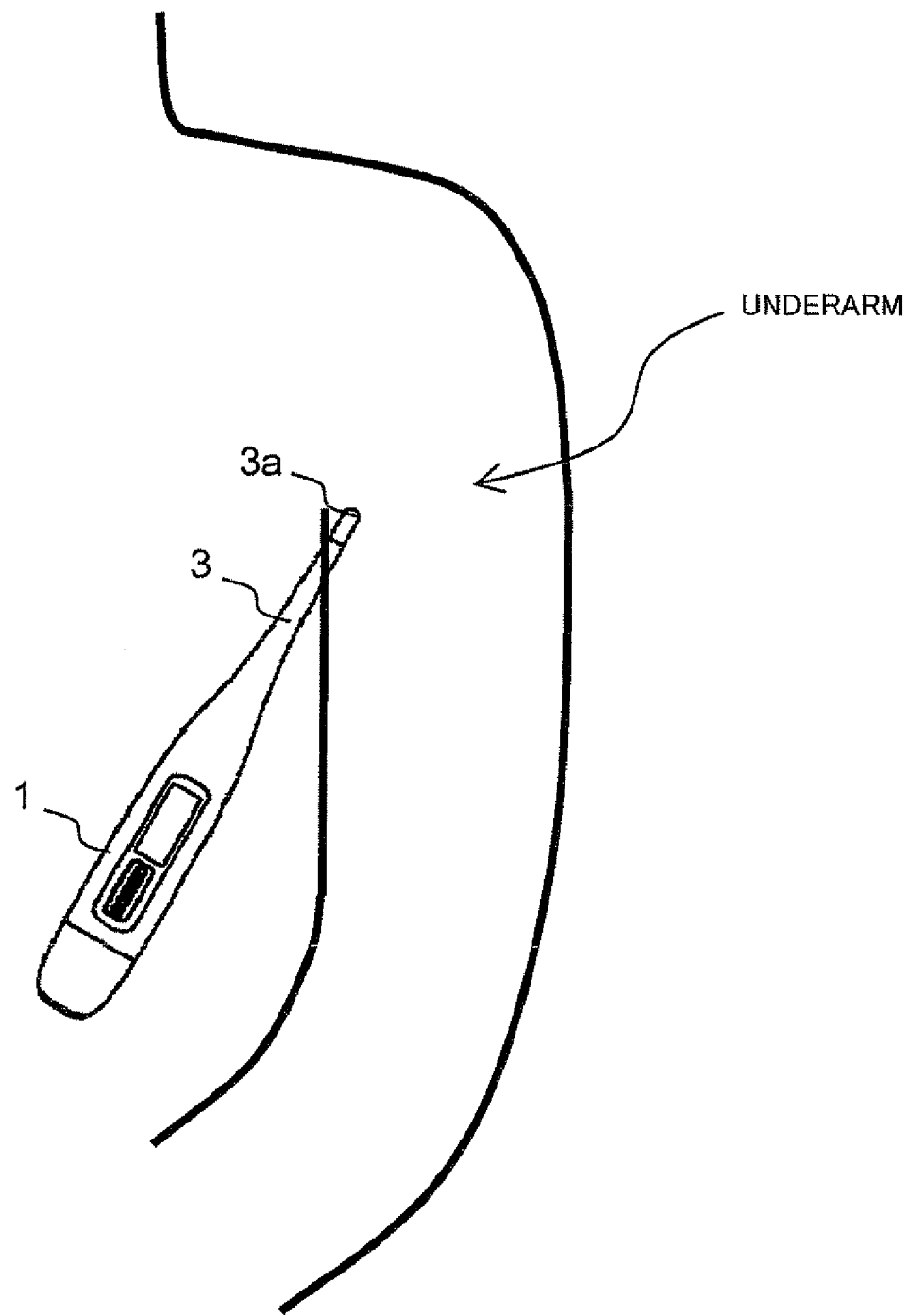
FIG. 7 shows an example 2 of bad measurement.

FIG. 7 shows an example 2 of the bad measurement. In the example of FIG. 7, the thermometer is inserted only a short distance so that only a end of probe 3 is held. In this state, the thermometer is unstable, and temperature measuring unit 3a has not reached the measurement target portion. Therefore, there is a high possibility that the position of the thermometer shifts during the temperature measuring, or the correct body temperature cannot be measured (predicted). FIGS. 8A and 8B show an example of the sensor output waveform in the measurement example of FIG. 7. Since probe 3 is not held firmly, the change in output of contact sensor 7 is very small. However, the portion including temperature sensor 6 is held in the underarm so that the rising of the temperature is observed. Accordingly, it can be understood that the contact failure shown in FIG. 7 or the like cannot be sensed only by temperature sensor 6 without difficulty.

Figure 9:
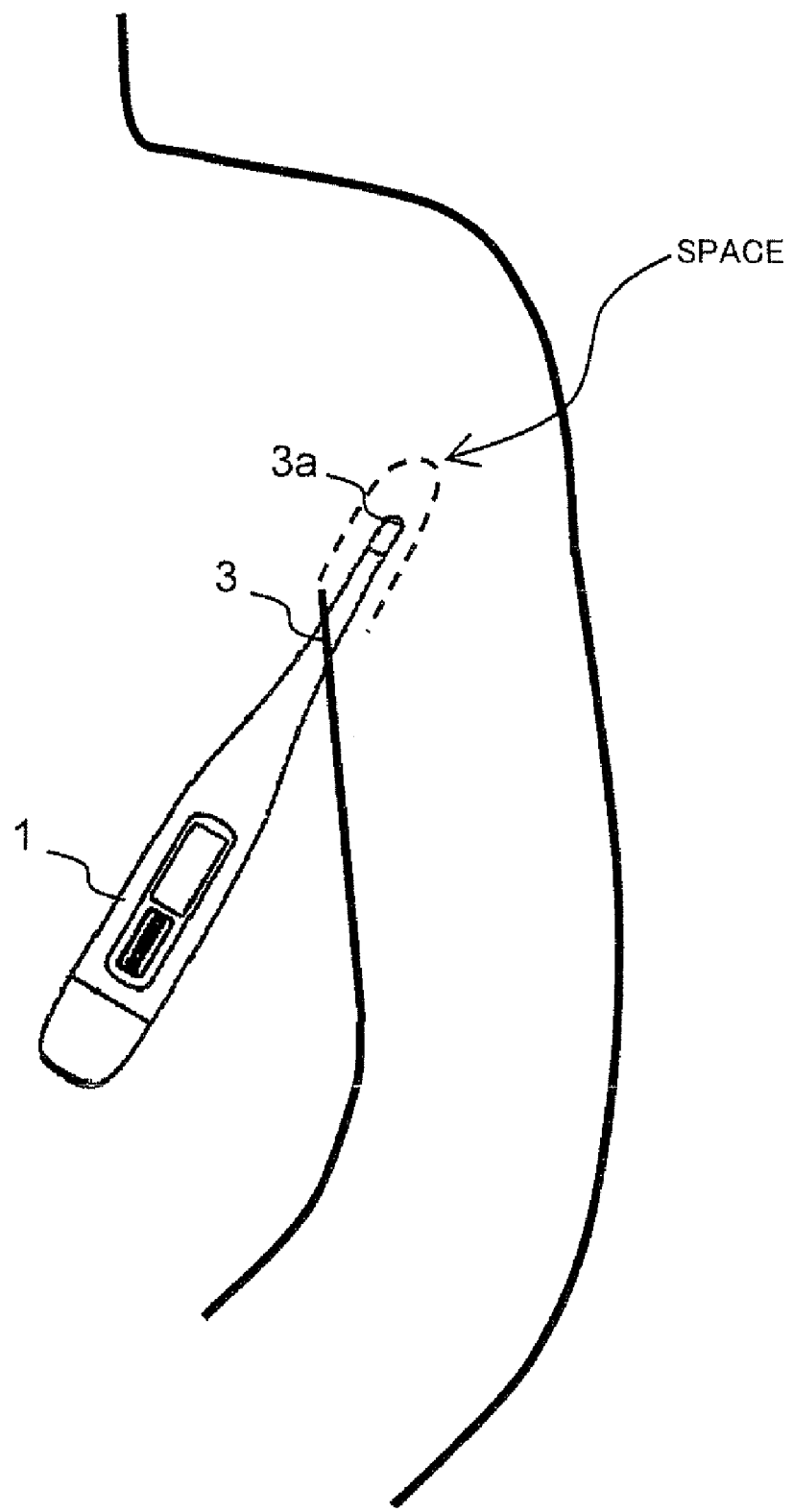
FIG. 9 shows an example 3 of bad measurement.
Figure 10:
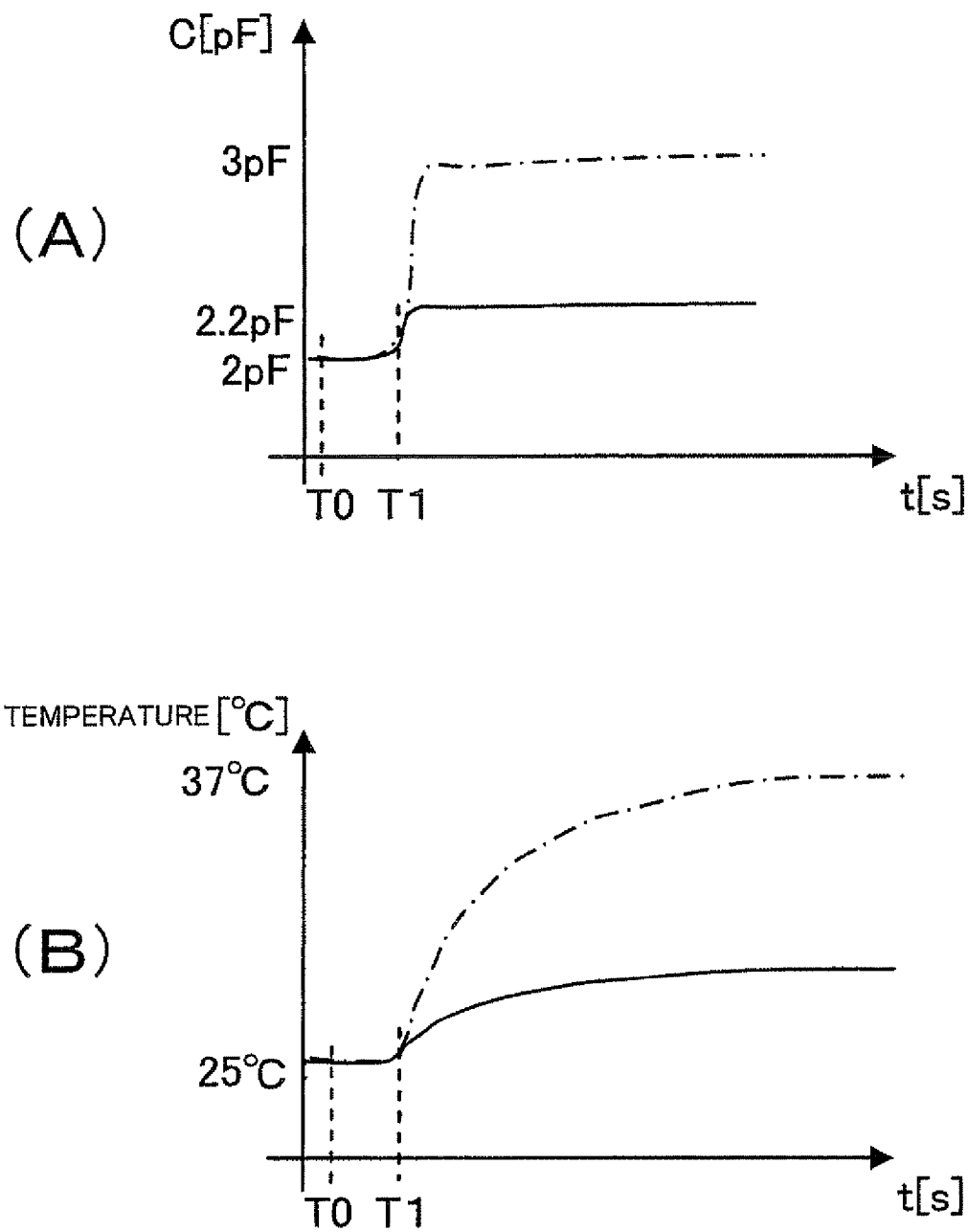
FIGS. 10A and 10B show an example of the sensor output waveform in the measurement example of FIG. 9.

FIG. 9 shows an example 3 of the bad measurement. In the example of FIG. 9, a space is present between probe 3 and the underarm (skin) due to excessively loose holding. In this state, no contact or only weak contact occurs between temperature measuring unit 3a and the measurement target portion so that the temperature cannot be measured (predicted) correctly. FIGS. 10A and 10B show an example of the sensor output waveform in the measurement example in FIG. 9. It can be seen that the output of each of contact sensor 7 and temperature sensor 6 does not change to a large extent.

As described above, the failure in contact state occurs due to several types of causes, and it is difficult to sense accurately all the types by only one of contact sensor 7 and temperature sensor 6. Also, it is difficult to discriminate between the type of FIG. 8A and that of FIG. 10A according to only the output of contact sensor 7, and it is difficult to discriminate between the type of FIG. 6B and that of FIG. 10B according to only the output of temperature sensor 6. Accordingly, electronic thermometer 1 according to the embodiment combines the two kinds of sensor outputs together to perform the evaluation, and thereby implements the improvement of the sensing accuracy, reduction of the sensing error and estimation of the cause (types) of failure.

Description will now be given on a specific example of a temperature (i.e., body temperature) measuring processing into which the sensing of the contact state is incorporated. Although the prediction type of temperature measuring processing will be described below by way of example, the sensing of the contact state to be described below can be equivalently applied to the temperature measuring processing of the actual measurement type.

First Embodiment

Figure 11:
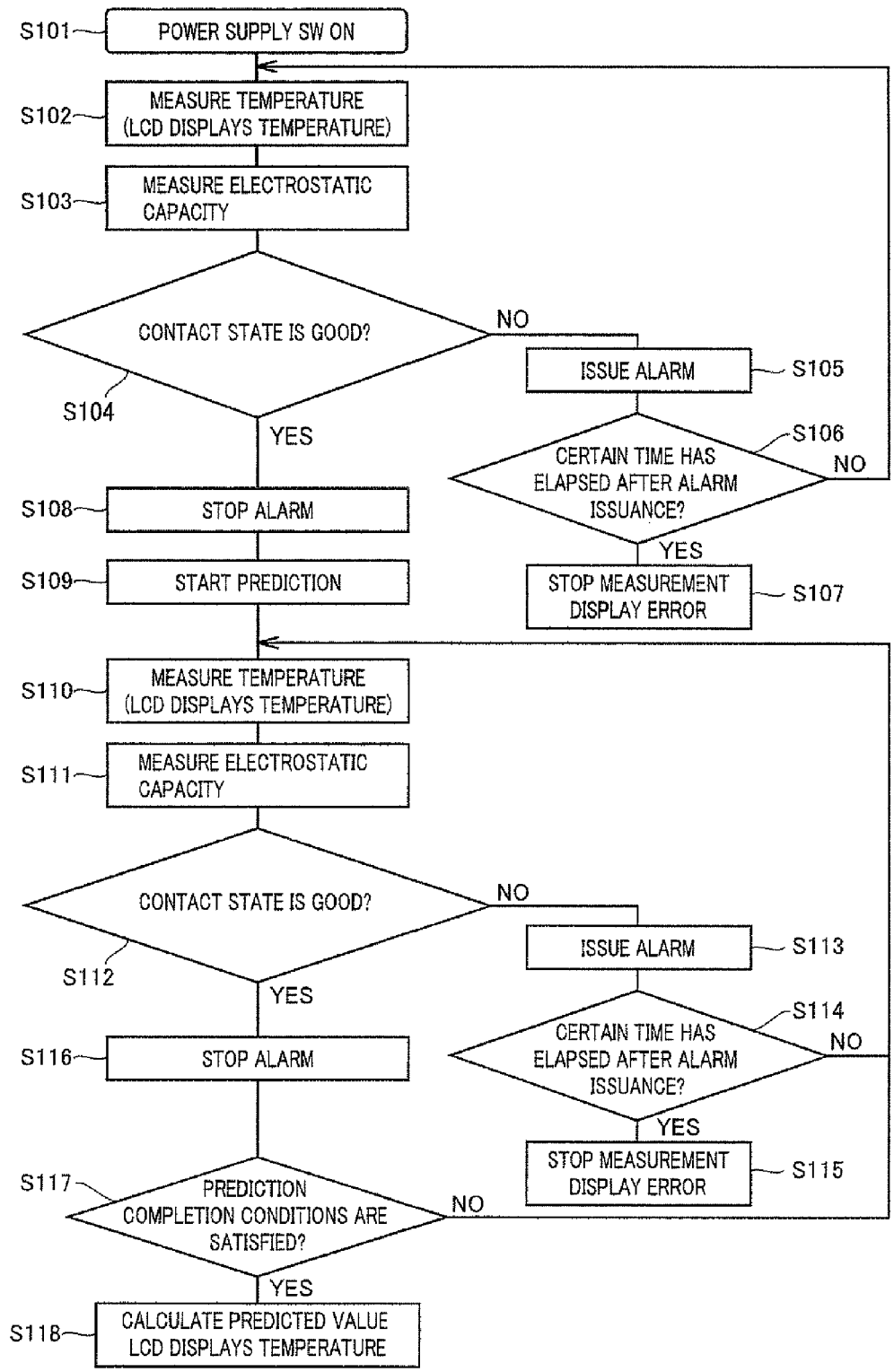
FIG. 11 is a flowchart of temperature (i.e., body temperature) measuring processing in a first example.

FIG. 11 is a flowchart of the temperature measuring processing of the first embodiment.

When electronic thermometer 1 is powered on (S101), CPU 14 starts the measurement of the temperature by temperature sensor 6 (S102), and starts the measurement of the electrostatic capacity contact sensor 7 (S103).

Based on both the outputs of temperature sensor 6 and contact sensor 7, CPU 14 determines whether the contact state between temperature measuring unit 3a and the measurement target portion is good or not (S104). Specifically, when (1) when a value of electrostatic capacity is larger than the value exhibited immediately after the power-on by a predetermined value, e.g., of 0.5 pF, and (2) a rising rate of the temperature is larger than a predetermined value e.g., when the temperature that has risen for 1 second is larger than 1° C., CPU 14 determines that "the contact state is good".

The types shown in FIGS. 5, 6A and 6B do not satisfy the conditions of the above item (2). This is also true when a user merely grasps the probe by the hand or fingers. The types shown in FIGS. 7, 8A and 8B do not satisfy the conditions of the above item (1), and the types shown in FIGS. 9, 10A and 10B satisfy neither the conditions of the above items (1) and (2). Therefore, each type provides a determination result that the contact state is bad.

When CPU 14 determines that the contact state is bad (NO in S104), it causes buzzer 13 to issue an alarm (S105). By providing the notification that the contact state is bad, it is possible to urge the user to correct the insertion state of the probe.

The processing from S102 to S106 repeats for a certain time (e.g., 15 seconds) from the alarm issuance (NO in S106). When the contact state is not corrected even after the certain time elapsed (YES in S106), CPU 14 stops the measurement, and performs the error display on LCD 12 (S107).

When it is determined that the contact state is good (YES in S104), CPU 14 stops the alarm (S108), and starts the prediction of the body temperature (S109).

Figure 12:
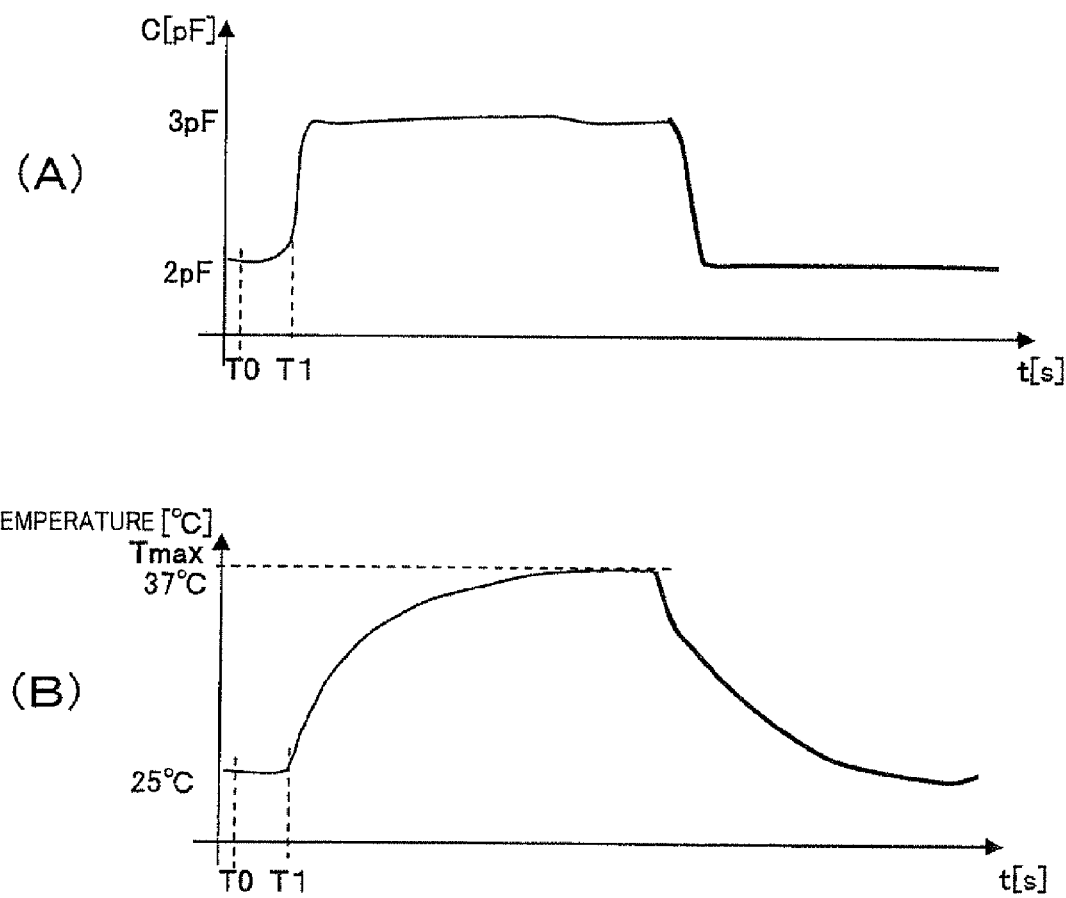
FIGS. 12A and 12B show an example of the sensor output waveform exhibited when a thermometer is disengaged during the temperature measuring.

Subsequently, CPU 14 causes temperature sensor 6 to measure the temperature (S110), and causes contact sensor 7 to measure the electrostatic capacity (S111). CPU 14 determines based on the outputs of both the sensors whether the contact state between temperature measuring unit 3a and the measurement target portion is good or not (S112). Specifically, when (a) the value of the electrostatic capacity is larger than the value exhibited immediately after the power-on by a predetermined value, e.g., of 0.5 pF, and (b) a value obtained by subtracting the current temperature from the maximum temperature obtained during a period from the power-on to the current time is smaller than a predetermined time, e.g., of 1° C., CPU 14 determines that "the contact state is good". For example, when probe 3 shifts to move temperature measuring unit 3a away from the measurement target portion during the temperature measurement (i.e., body temperature measurement), the electrostatic capacity and the temperature lower as shown in FIGS. 12A and 12B. Thereby, the conditions (a) or (b) are not satisfied so that the bad contact state can be sensed.

When the bad contact state is sensed during the temperature measurement (NO in S112), CPU 14 activates buzzer 13 to issue the alarm (S113). By providing the notification about the bad contact state, it is possible to urge the user to correct the insertion state of the probe or to close tightly the underarm. When the contact state is not corrected even after the certain time elapsed from the alarm issuance (YES in S114), CPU 14 stops the measurement, and performs the error display on LCD 12 (S115).

When CPU 14 determines that the contact state is good (YES in S112), it stops the alarm (S116), and continues sensing the temperature and the electrostatic capacity until the prediction completion conditions are satisfied (NO in S117).

For example, the prediction completion conditions may be such that the time elapsed after the start of the body temperature prediction exceeds a predetermined value, e.g., of 60 seconds. However, when the bad contact state is sensed (NO in S112), CPU 14 interrupts or resets the counting of the elapsed time, and will resume the counting when the good contact state is attained. The prediction completion conditions may be that the temperature rising rate is smaller than a predetermined value.

When the prediction completion conditions are satisfied (YES in S117), CPU 14 ends the measurement, calculates the predicted value of the body temperature and displays it on LCD 12 (S118).

Advantages of the Embodiment

According to the embodiment, since the outputs of both the temperature sensor and the contact sensor are referred to, it is possible to evaluate the states of at least two portions, i.e., the temperature measuring unit at the end of the probe and the portion relative close to the probe body. Therefore, the contact state between the temperature measuring unit and the measurement target portion can be determined more accurately than the prior art.

The combination of the two kinds of sensors sensing the different targets, respectively, can reduce the erroneous sensing. Further, the temperature is monitored in the portion to be placed on the measurement target portion (i.e., the hottest portion), and the contact sensing is performed in the portion to be placed on the portion closer to the probe body than the measurement target portion (i.e., the portion for holding the probe). This arrangement of the sensors can cause a large difference in output between the good contact state and the bad contact state, and therefore can improve the determination accuracy.

Since the temperature sensor for the temperature measurement is also used as the sensor for sensing the contact state, it is possible to offer an advantage that the number of parts, the sizes of the end of the probe and the cost can be reduced, as compared with the case where these sensors are independent of each other.

Since the thermometer senses the contact state between the temperature measuring unit and the measurement target portion not only at the start of the measurement but also during the measuring operation, it can always monitor the contact state between the measurement target portion and the temperature measuring unit so that the accuracy of the temperature measurement can be improved. Therefore, the embodiment can be used particularly appropriately in the prediction type of thermometer. Thus, the prediction type of thermometer can measure the temperature within a short time, but the accuracy of the prediction may be low when the measurement target portion is not firmly in contact with the measurement target portion. However, the embodiment starts the prediction only after the temperature measuring unit appropriately came into contact with the measurement target portion, and therefore can predict the temperature more accurately.

Second Embodiment

Figure 13:
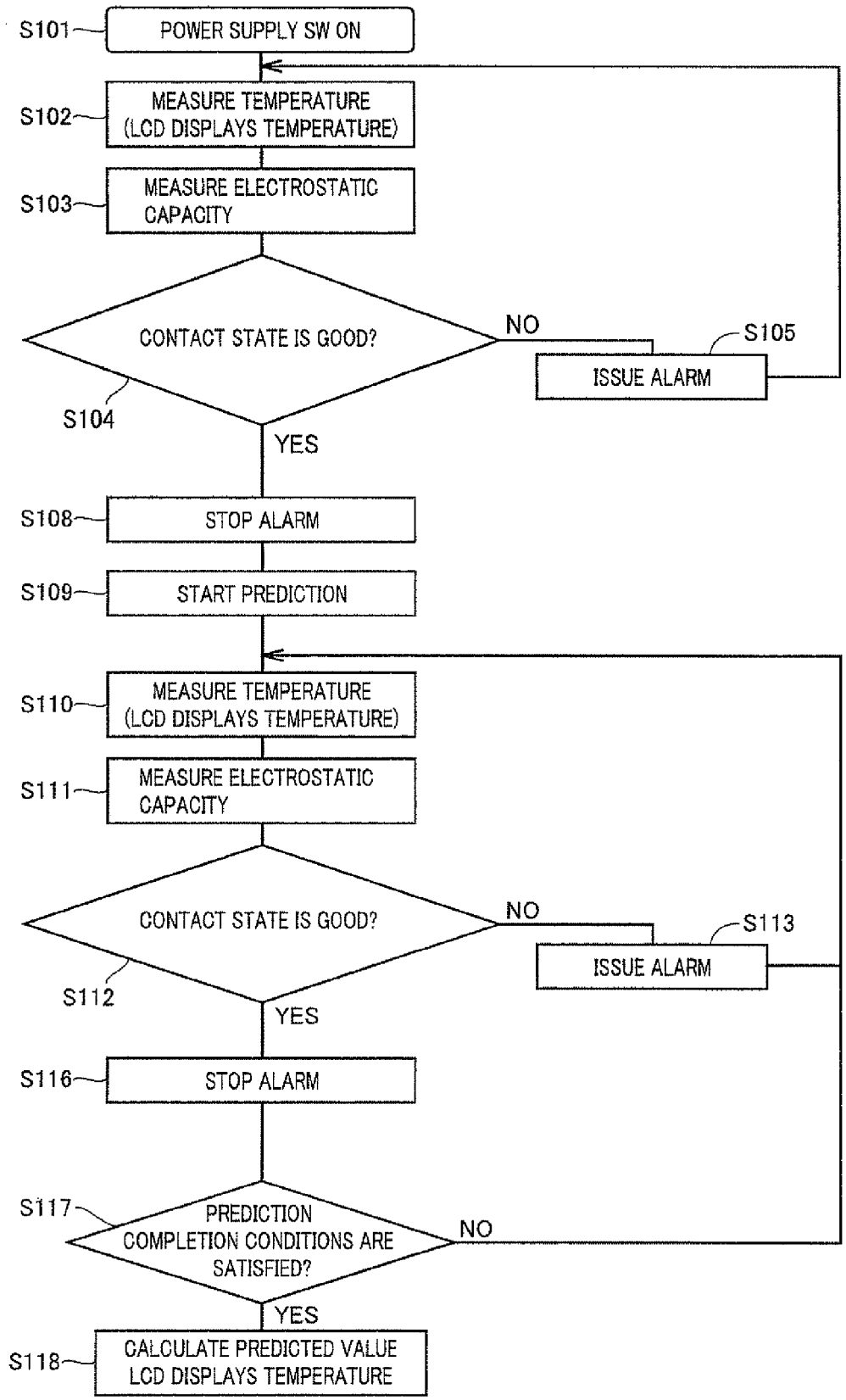
FIG. 13 is a flowchart of temperature measuring processing in a second example.

FIG. 13 is a flowchart of a temperature measuring processing of a second embodiment, which is different from the first embodiment (FIG. 11) in that the processing in S106, S107, S114 and S115 are not employed. Thus, in contrast to the first embodiment that stops the measurement and displays the error when the bad contact state continues for a certain time, the second embodiment continues the alarm issuance until the contact state becomes good.

For returning from the error state, the conventional thermometer requires an inconvenient operation such as turning on the power again, resetting a reset button or resetting the thermometer. In contrast to this, the thermometer of this embodiment does not enter the error state, and therefore does not require the resetting, which improves usability.

Third Embodiment

Figure 14:
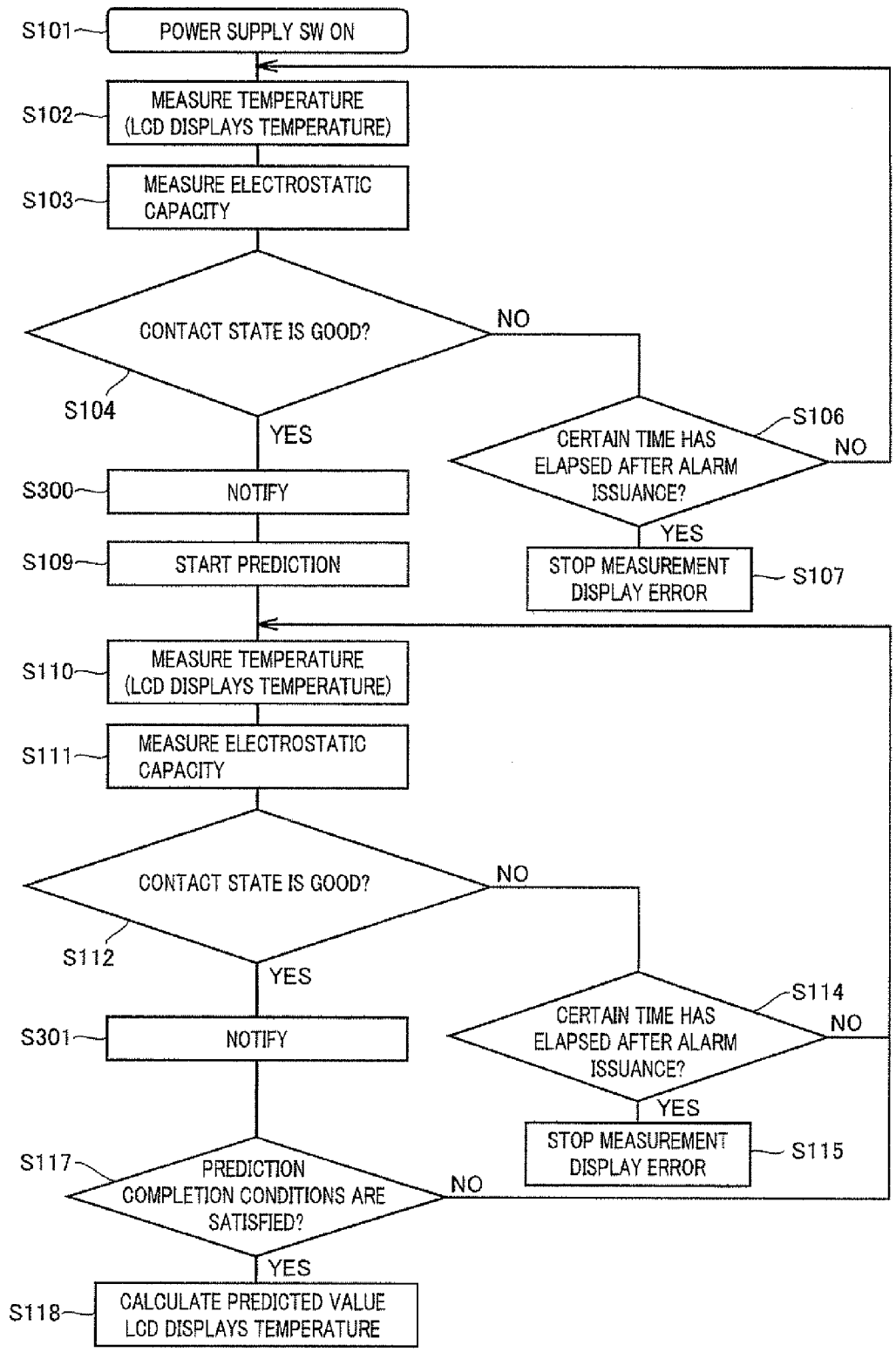
FIG. 14 is a flowchart of temperature measuring processing in a third example.

FIG. 14 is a flowchart of a temperature measuring processing of a third embodiment, which is different from the first embodiment (FIG. 11) in that the embodiment does not include the processing in S105, S108, S113 and S116, but includes processing in S300 and S301. Thus, in contrast to the first embodiment issuing the alarm representing that the contact state is bad, the third embodiment provides a notification that the contact state is good (S300 and S301).

When the contact state is good in the stage before the temperature measurement (YES in S104), CPU 14 causes buzzer 13 to sound "Pi, Pi" (S300). Thereby, the user can recognize that the current contact state is good and the temperature measurement started.

During the temperature measurement, buzzer 13 periodically sounds "Pi, Pi" while the contact state is good (S301). The measurement of the body temperature requires several tens of seconds or several minutes, during which the user must keep the same posture or position. If the thermometer provides no notification, the user may have a fear that the temperature measuring processing is not continuing, or the user may move the thermometer or may remove it from the measurement target portion for confirming the operation of the thermometer. However, when the notification that the contact state is good is periodically issued, the user can recognize that the measuring processing is correctly continuing so that the above problem can be overcome.

Figure 15:
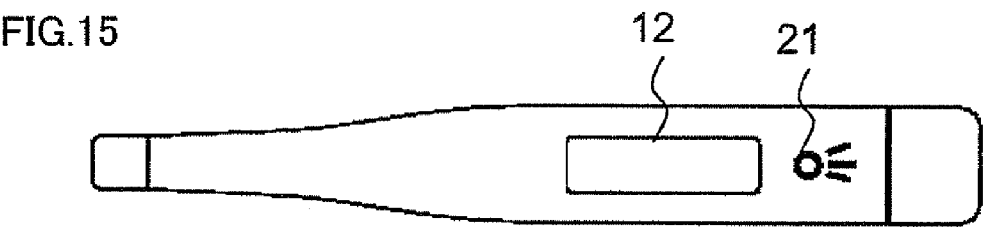
FIG. 15 shows an example (LED) of a notifying unit.
Figure 16:
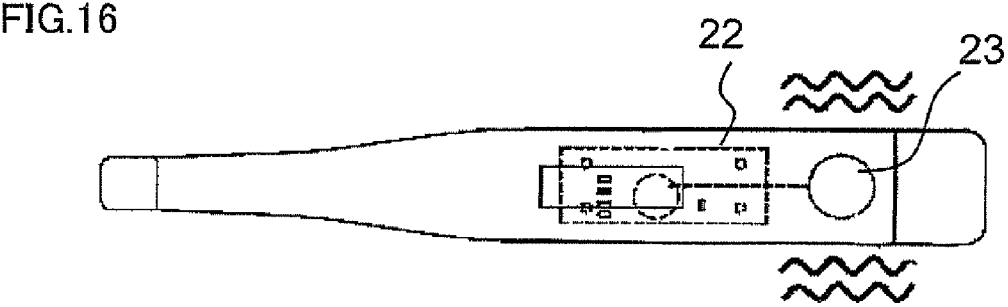
FIG. 16 shows an example (vibration motor) of the notifying unit.
Figure 17:
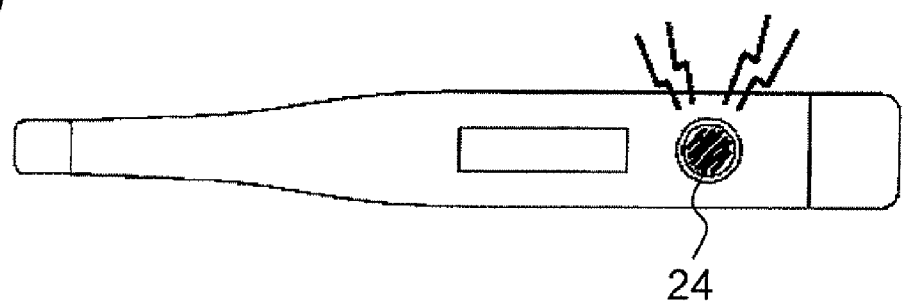
FIG. 17 shows an example (speaker) of the notifying unit.

In the embodiment described above, the notification by buzzer 13 has been described by way of example, but the structure of the notifying unit is not restricted to it. For example, as shown in FIG. 15, light of an LED 21 or display on LCD 12 may be used for notifying of the good or bad contact state. As shown in FIG. 16, vibrations of a vibration motor 23 arranged on a substrate 22 may be used to notify the good or bad contact state. Also, as shown in FIG. 17, the output of a sound from a speaker 24 may be used to notify the good or bad contact state.

Fourth Embodiment

Figure 18:
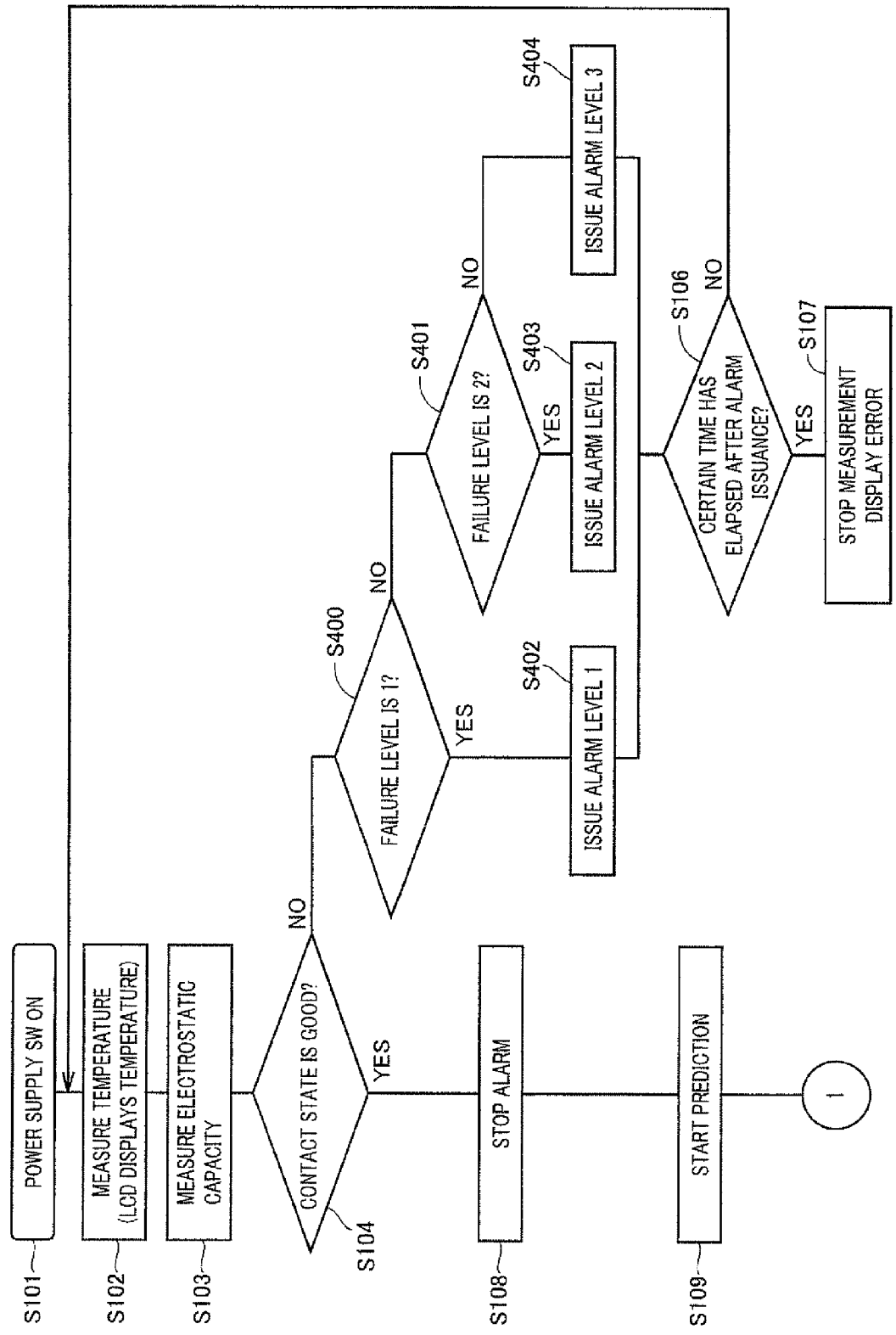
FIG. 18 is a flowchart of temperature measuring processing (before measurement) in a fourth example.
Figure 19:
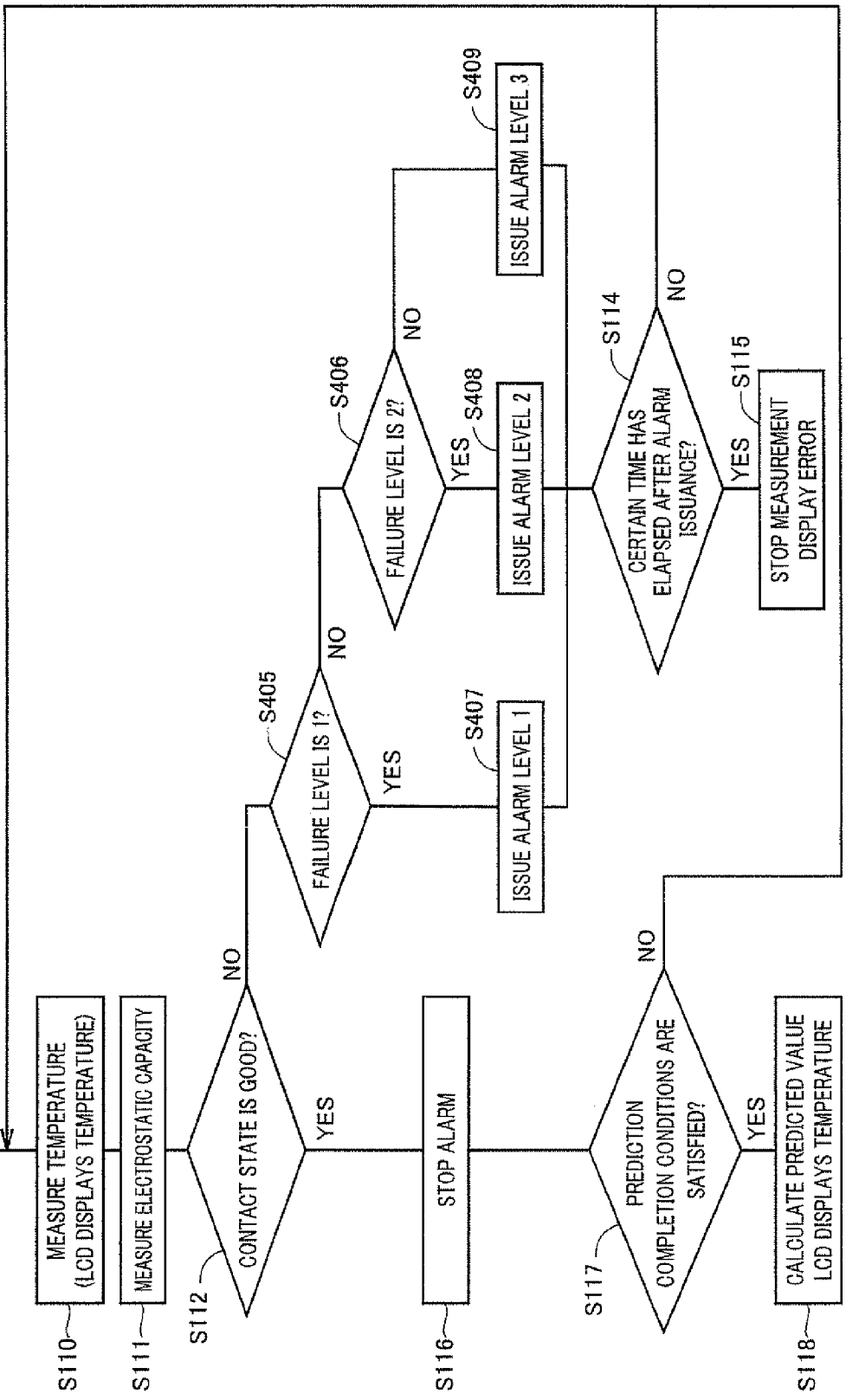
FIG. 19 is a flowchart of the temperature measuring processing (during measurement) in the fourth example.

FIGS. 18 and 19 are flowcharts of a temperature measuring processing of a fourth embodiment, which is different from the first embodiment (FIG. 11) in that the fourth embodiment does not employ the processing in S105 and S113, but includes processing in S400-S409. In the first embodiment, CPU 14 determines a level of failure in the contact state (S400, S401, S405 and S406), and the notifying unit provides the notification according to the level of failure (S402-S404, S407 and S409).

(Before Body Temperature Measurement)

In S104, CPU 14 calculates the following two values $\Delta C$ and $\Delta T$.

$\Delta C$=(current electrostatic capacity)−(electrostatic capacity immediately after power-on)

$\Delta T$=(current temperature)−(temperature of one second before)

When two conditions of ($\Delta C > 0.5$ pF) and ($\Delta T > 1°$ C.) are satisfied, CPU 14 determines that the contact state is good (YES in S104). When $\Delta C \leq 0.5$ pF, or $\Delta T \leq 1°$ C., CPU 14 proceeds to the determination of the failure level (NO in S104).

When $\Delta C > 0.3$ pF, or $\Delta T > 0.7°$ C., it is determined that the failure level is "1" (YES in S400), and an alarm corresponding to the level 1 is issued (S402). For example, such an output form may be employed that the buzzer sounds at a "small" volume level, a "green" LED is turned on, "weak" vibrations occur or a sound "YURU" is produced.

When $\Delta C > 0.2$ pF, or $\Delta T > 0.5°$ C., it is determined that the failure level is "2" (YES in S401), and the alarm corresponding to the level 2 is issued (S403). For example, such an output form may be employed that the buzzer sounds at a "middle" volume level, "red and green" LEDs are turned on, "middle" vibrations occur or a sound "YURUYURU" is produced.

When any one of the above conditions is satisfied (NO in S401), it is determined that the failure level is "3", and the alarm corresponding to the level 3 is issued (S404). For example, such an output form may be employed that the buzzer sounds at a "large" volume level, the "red" LED is turned on, "strong" vibrations occur or a sound "YURUYU-RUYURU" is produced.

(During Temperature Measurement)

During the temperature measurement, CPU 14 calculates following two values $\Delta Ca$ and $\Delta Ta$ in S112.

$\Delta Ca$=(current electrostatic capacity)−(electrostatic capacity immediately after power-on)

$\Delta Ta$=(highest temperature between power-on and current time)−(current temperature)

When two conditions of ($\Delta Ca > 0.5$ pF) and ($\Delta Ta < 1°$ C.) are satisfied, CPU 14 determines that the contact state is good (YES in S112). When $\Delta Ca \leq 0.5$ pF or $\Delta Ta \geq 1°$ C., CPU 14 proceeds to the determination of the failure level (NO in S112).

When $\Delta Ca > 0.3$ pF or $\Delta Ta < 1.5°$ C., the determined failure level is "1" (YES in S405), and the alarm corresponding to the level 1 is issued (S407). When $\Delta Ca > 0.2$ pF or $\Delta Ta < 2.0°$ C., the determined failure level is "2" (YES in S406), and the alarm corresponding to the level 2 is issued (S408). In the case other than the above (NO in S406), the determined failure level is "3", and the alarm corresponding to the level 3 is issued (S409). The output forms of these alarms are substantially the same as that already described.

The structure of the embodiment can notify the user of the level of failure when the failure occurs in the contact state. When the failure level can be determined, the user can determine that the contact state can be improved only by slightly moving probe 3, or can be improved quickly by removing and then reinserting the probe to the measurement target portion, rather than slightly moving it. This can improve the usability of the electronic thermometer.

Fifth Embodiment

Figure 20:
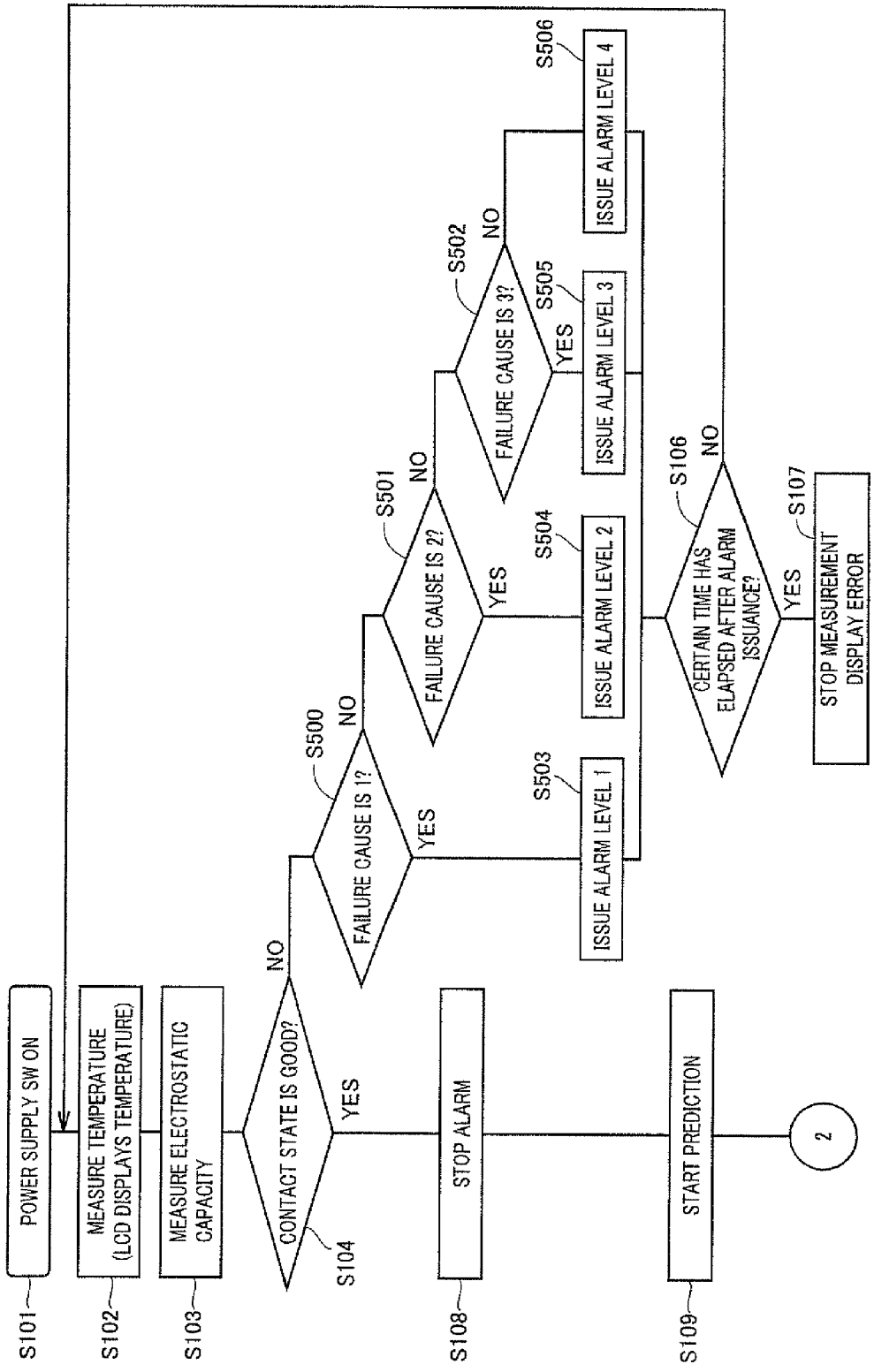
FIG. 20 is a flowchart of temperature measuring processing (before measurement) in a fifth example.
Figure 21:
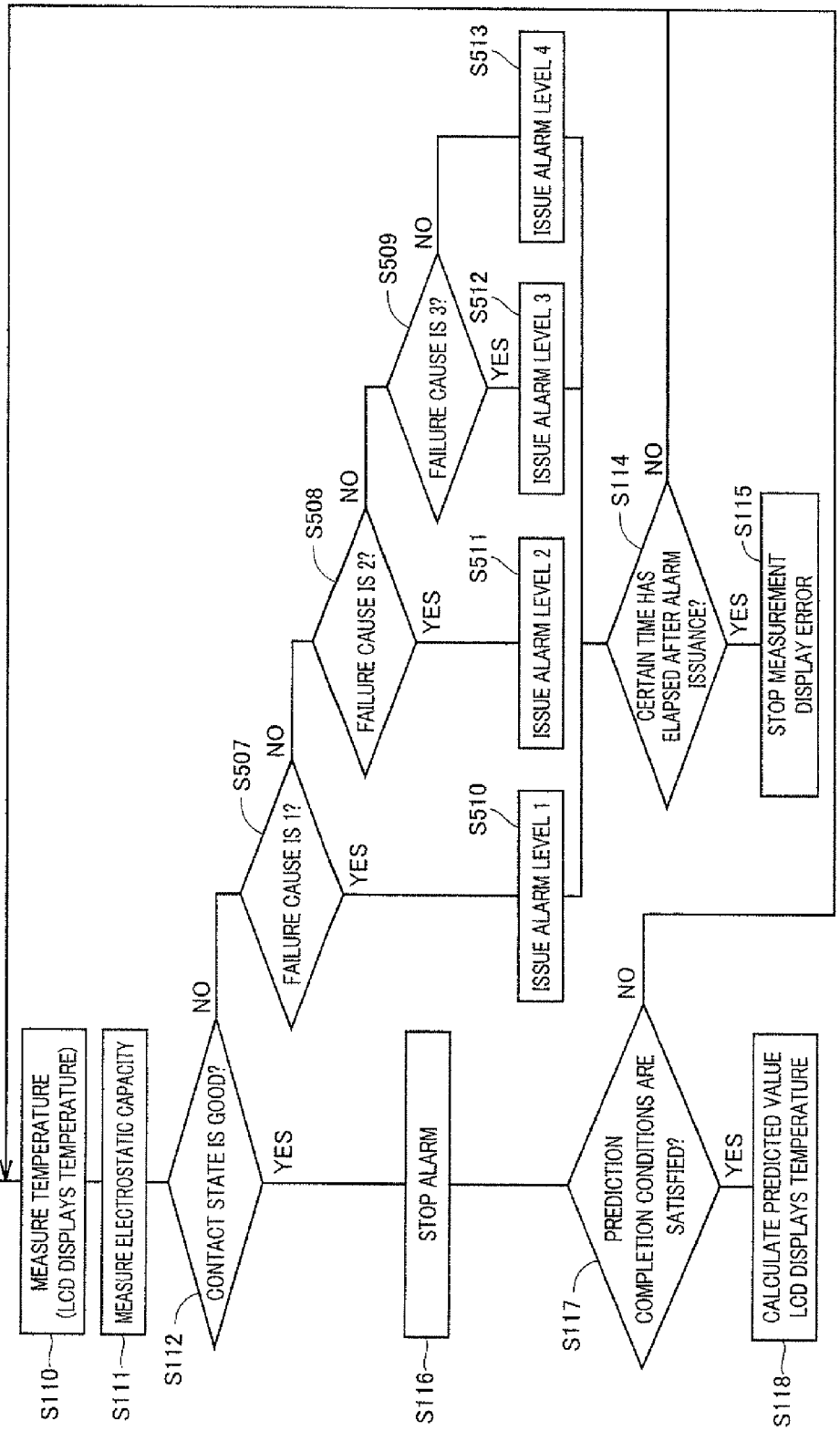
FIG. 21 is a flowchart of the temperature measuring processing (during measurement) in the fifth example.

FIGS. 20 and 21 are flowcharts of the temperature measuring processing of a fifth embodiment, which is different from the first embodiment (FIG. 11) in that the fifth embodiment does not employ the processing in S105 and S113, but includes processing in S500-S513. The first embodiment merely issues the alarm when the determined contact state is bad. Conversely, in the fifth embodiment, CPU 14 estimates a cause of a failure in contact state, based on the outputs of the temperature sensor and the contact sensor (S500-S502 and S507-S509), and the notifying unit provides a notification corresponding to the cause of the failure (S503-S506 and S510-S513).

(Before Temperature Measurement)

In S104, CPU 14 calculates the following two values $\Delta C$ and $\Delta T$. From the combination of $\Delta C$ and $\Delta T$, CPU 14 determines the contact state and the cause of the failure.

$\Delta C$=(current electrostatic capacity)−(electrostatic capacity immediately after power-on)

$\Delta T$=(current temperature)−(temperature of one second before)

Figure 22:
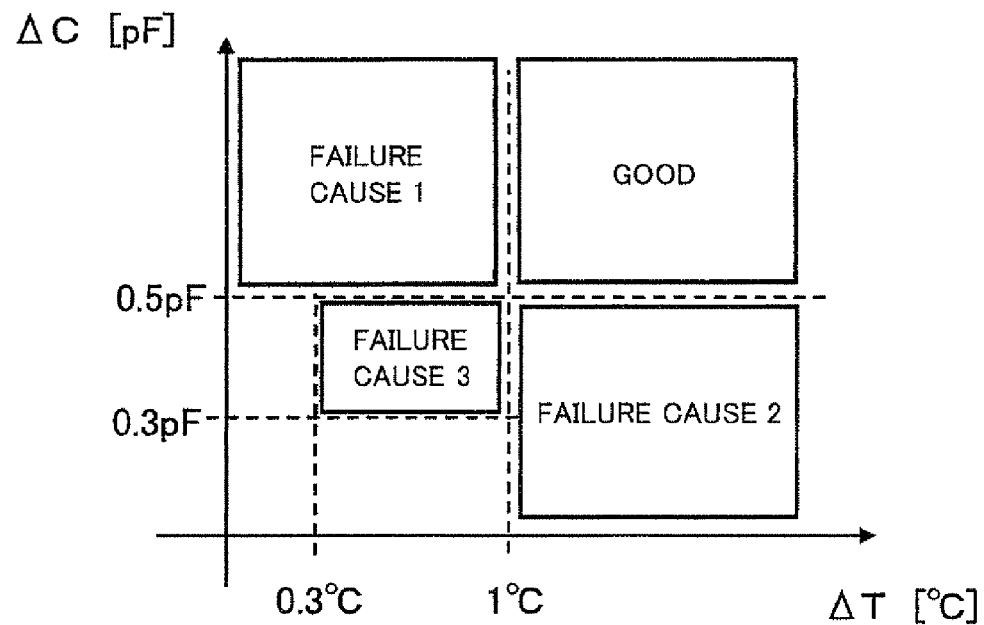
FIG. 22 is a determination table illustrating a contact state and a cause of a failure before body temperature measuring.

FIG. 22 is a determination table illustrating a contact state and the cause of the failure before temperature measuring. In FIG. 22, the ordinate given the value of $\Delta T$, and the abscissa gives the value of $\Delta C$. A failure cause 1 is that the end of the probe protrudes (a type in FIG. 5), a failure cause 2 is the only the end of the probe is held (a type in FIG. 7), and a failure cause 3 is that a space occurs (a type in FIG. 9).

When two conditions of ($\Delta Ca>0.5$ pF) and ($\Delta T>1°$ C.) are satisfied, CPU 14 determines that the contact state is good (YES in S104). When $\Delta Ca\leq 0.5$ pF or $\Delta Ta\leq 1°$ C., CPU 14 proceeds to the estimation of the failure cause (NO in S104).

When $\Delta Ca>0.5$ pF and $\Delta Ta\leq 1°$ C., the determined failure cause is "1" (YES in S500), and the alarm corresponding to the failure cause 1 is issued (S503). For example, such an output form may be employed that the buzzer sounds at a "small" volume level, the "green" LED is turned on or "weak" vibrations occur. Voice guidance "The end of the thermometer is protruded. Please withdraw the thermometer slightly," may be issued for improving the contact state.

When $\Delta C\leq 0.5$ pF and $\Delta T>1°$ C., the determined failure cause is "2" (YES in S501), and the alarm corresponding to the failure cause 2 is issued (S504). For example, such an output form may be employed that the buzzer sounds at a "middle" volume level, the "red and green" LEDs are turned on or "middle" vibrations occur. Also, voice guidance "Please insert the thermometer deeply," may be issued.

When 0.3 pF$<\Delta C\leq 0.5$ pF and 0.3° C.$<\Delta T\leq 1°$ C., the determined failure cause is "3" (YES in S502), and the alarm corresponding to the failure cause 3 is issued (S505). For example, such an output form may be employed that the buzzer sounds at a "large" volume level, the "red" LED is turned on or "strong" vibrations occur. Also, voice guidance "Please hold the thermometer firmly," may be issued.

In the case other than the above (NO in S502), it is determined that the thermometer is not yet held in the underarm, and an alarm is issued (S506), For example, such an output form may be employed that the buzzer sounds at a "large" volume level, the "red" LED is turned on or "strong" vibrations occur. Also, voice guidance "Thermometer is available. Please hold the thermometer," may be issued.

(During Temperature Measurement)

During the temperature measurement, CPU 14 calculates the following two values $\Delta Ca$ and $\Delta Ta$ in S112. From the combination of $\Delta Ca$ and $\Delta Ta$, CPU 14 determines the contact state and the cause of the failure.

$\Delta Ca$=(current electrostatic capacity)−(electrostatic capacity immediately after power-on)

$\Delta Ta$=(highest temperature between power-on and current time)−(current temperature)

Figure 23:
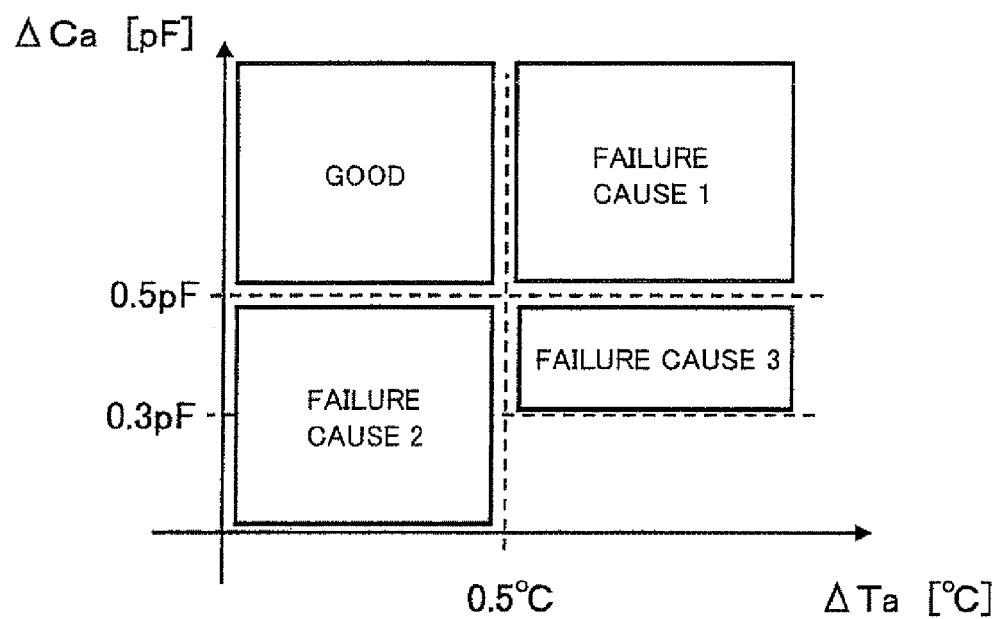
FIG. 23 is a determination table illustrating the contact state and the cause of failure during body temperature measuring.

FIG. 23 is a determination table illustrating the contact state and the cause of the failure during the temperature measuring. In FIG. 23, the ordinate given the value of $\Delta Ta$, and the abscissa gives the value of $\Delta Ca$. The failure causes 1 to 3 are substantially the same as those already illustrated in FIG. 22.

Thus, when the two conditions of ($\Delta Ca>0.5$ pF) and ($\Delta Ta<0.5°$ C.) are satisfied, CPU 14 determines that the contact state is good (YES in S112). When $\Delta Ca\leq 0.5$ pF or $\Delta Ta\geq 0.5°$ C., CPU 14 proceeds to the estimation of the failure cause (NO in S112).

When $\Delta Ca>0.5$ pF and $\Delta Ta\geq 0.5°$ C., the determined failure cause is "1" (YES in S507), and the alarm or voice guidance corresponding to the failure cause 1 is issued (S510). When $\Delta Ca\leq 0.5$ pF and $\Delta Ta<0.5°$ C., the determined failure cause is "2" (YES in S508), and the alarm or voice guidance corresponding to the cause 2 is issued (S511). When 0.3 pF$<\Delta Ca\leq 0.5$ pF and $\Delta Ta\geq 0.5°$ C., the determined failure cause is "3" (YES in S509), and the alarm or voice guidance corresponding to the cause 3 is issued (S512). In the case other than the above (NO in S509), it is determined that the thermometer is disengaged from the underarm, and the alarm or voice guidance is issued (S513). The output forms of these alarms and voice guidance are substantially the same as those already described.

According to the structure of the embodiment, when the contact state is bad, the thermometer can notify the user of the cause of the failure and the solution. By understanding the cause of the failure and the solution, the user can easily understand a specific manner for improving the contact state. This improves the usability of the electronic thermometer, and can show the user the correct manner of measurement.

Although the present invention has been described and illustrated in detail, it is clearly understood that the same is by way of illustration and example only and is not to be taken by way of limitation, the scope of the present invention being interpreted by the terms of the appended claims. For example, the specific flow of the determination processing, the thresholds for determination, the output forms of the notification and voice guidance, the manner of determining the failure level and the manner of estimating the failure cause can be appropriately designed according to the type and sensitivity of the employed sensors, the product specification of the thermometer and the like. The structures of the foregoing embodiments may be combined together.

The invention claimed is:

1. An electronic thermometer comprising:
    a probe having a temperature measuring unit at the an end of said probe;
    a first sensor arranged in said temperature measuring unit of said probe for measuring a temperature;
    a second sensor arranged in a position between said temperature measuring unit of said probe and a thermometer body for sensing a contact with a human body;
    a determining unit for determining whether a state of contact between said temperature measuring unit and a measurement target portion of a user is good or not, based on both outputs of said first and second sensors; and
    a notifying unit for performing notification according to a result of determination of said determining unit.

2. The electronic thermometer according to claim 1, wherein said first sensor serves also as a sensor for measuring a body temperature of said user.

3. The electronic thermometer according to claim 1, wherein said notifying unit can notify at least that the contact state is good, during measurement of the body temperature.

4. The electronic thermometer according to claim 1, wherein when the contact state is bad, said determining unit determines a level of a failure in the contact state based on the outputs of said first and second sensors, and said notifying unit performs the notification according to said level of the failure.

5. The electronic thermometer according to claim 1, wherein when the contact state is bad, said determining unit estimates a cause of a failure in the contact state based on the outputs of said first and second sensors, and said notifying unit performs the notification according to said cause of the failure.

6. The electronic thermometer according to claim 5, wherein said notifying unit provides guidance on solution to said cause of the failure.

7. The electronic thermometer according to claim 1, wherein said notifying unit includes an LED, and performs the notification utilizing a state of turn-on/off of said LED.

8. The electronic thermometer according to claim 7, wherein said notifying unit performs the notification by turning on said LED in different colors depending on the good contact state and the bad contact state, respectively.

9. The electronic thermometer according to claim 8, wherein said notifying unit includes a buzzer for performing the notification by turning on said buzzer when the contact state is bad.

10. The electronic thermometer according to claim 1, wherein the second sensor includes an electrostatic capacity sensor.

11. The electronic thermometer according to claim 1, wherein the determining unit determines whether a state of contact between said temperature measuring unit and a measurement target portion of a user is good or not, based on the output with regard to the temperature of said first sensor and the output with regard to the contact state of said second sensor.

* * * * *